United States Patent
Kim et al.

(10) Patent No.: US 9,989,815 B2
(45) Date of Patent: Jun. 5, 2018

(54) LIQUID CRYSTAL DISPLAY DEVICE

(71) Applicant: Samsung Display Co. Ltd., Yongin (KR)

(72) Inventors: Sang Gyun Kim, Hwaseong-si (KR); Heung Shik Park, Seoul (KR); Kyung Min Kim, Seoul (KR); Hoon Kim, Ansan-si (KR); Ki Chul Shin, Seongnam-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 148 days.

(21) Appl. No.: 15/005,421

(22) Filed: Jan. 25, 2016

(65) Prior Publication Data
US 2017/0059947 A1    Mar. 2, 2017

(30) Foreign Application Priority Data
Aug. 24, 2015 (KR) .................. 10-2015-0118935

(51) Int. Cl.
*G02F 1/1343* (2006.01)
*G02F 1/1337* (2006.01)

(52) U.S. Cl.
CPC .. *G02F 1/134309* (2013.01); *G02F 1/133707* (2013.01); *G02F 1/133788* (2013.01)

(58) Field of Classification Search
CPC ......... G02F 1/133707; G02F 1/134336; G02F 1/134309; G02F 1/133788
See application file for complete search history.

(56) References Cited

U.S. PATENT DOCUMENTS

| | | | |
|---|---|---|---|
| 6,259,200 B1* | 7/2001 | Morita ............. | G02F 1/133512 313/498 |
| 2003/0107687 A1* | 6/2003 | Choo ................ | G02F 1/133707 349/39 |
| 2003/0128325 A1* | 7/2003 | Yun .................. | G02F 1/133707 349/143 |
| 2005/0219436 A1* | 10/2005 | Kwon .............. | G02F 1/136209 349/44 |
| 2010/0026948 A1* | 2/2010 | Wang ................. | G02F 1/1337 349/129 |
| 2010/0060838 A1* | 3/2010 | Kim .................. | G02F 1/134309 349/141 |

(Continued)

FOREIGN PATENT DOCUMENTS

| KR | 1020120050645 | 5/2012 |
|---|---|---|
| KR | 1020120074967 | 7/2012 |

(Continued)

*Primary Examiner* — Jia Pan
(74) *Attorney, Agent, or Firm* — Cantor Colburn LLP

(57) ABSTRACT

A liquid crystal display device includes an insulating substrate, a data line disposed on the insulating substrate and extended in a first direction, a plurality of pixel electrodes which is disposed on the insulating substrate and in which a slit pattern is defined, a common electrode facing the pixel electrodes, and a liquid crystal layer interposed between the pixel electrodes and the common electrode, where each of the pixel electrodes includes an edge electrode portion and a plurality of branch electrode portions protruding in a direction toward a central portion of the pixel electrode from the edge electrode portion, and at least a portion of the edge electrode portion overlaps the data line.

18 Claims, 14 Drawing Sheets

(56) References Cited

U.S. PATENT DOCUMENTS

| | | | |
|---|---|---|---|
| 2011/0141419 A1* | 6/2011 | Nagata | G02F 1/133788 349/123 |
| 2011/0261278 A1 | 10/2011 | Oh et al. | |
| 2012/0120334 A1* | 5/2012 | Lee | G02F 1/133707 349/33 |
| 2013/0285891 A1* | 10/2013 | Zhang | G02F 1/133707 345/90 |
| 2013/0314640 A1* | 11/2013 | Kang | G02F 1/1337 349/61 |
| 2014/0211142 A1 | 7/2014 | Kim et al. | |
| 2015/0124202 A1* | 5/2015 | Kang | G02F 1/133707 349/98 |
| 2016/0154282 A1 | 6/2016 | Kim et al. | |
| 2016/0238915 A1 | 8/2016 | Kim et al. | |
| 2016/0313594 A1 | 10/2016 | Kim et al. | |
| 2016/0349569 A1 | 12/2016 | Kim et al. | |

FOREIGN PATENT DOCUMENTS

| | | |
|---|---|---|
| KR | 1020120120761 | 11/2012 |
| KR | 1020140097905 | 8/2014 |
| KR | 1020140110829 | 9/2014 |
| KR | 1020140122175 | 10/2014 |
| KR | 1020160064323 | 6/2016 |
| KR | 1020160101316 | 8/2016 |
| KR | 1020160127210 | 11/2016 |
| KR | 1020160141928 | 12/2016 |

\* cited by examiner

LIQUID CRYSTAL DISPLAY DEVICE

This application claims priority to Korean Patent Application No. 10-2015-0118935, filed on Aug. 24, 2015, and all the benefits accruing therefrom under 35 U.S.C. § 119, the content of which in its entirety is herein incorporated by reference.

BACKGROUND

1. Field

Exemplary embodiments of the invention relate to a liquid crystal display ("LCD") device.

2. Description of the Related Art

A liquid crystal display ("LCD"), one of flat panel displays that are currently the most widely used, may generally include two substrates provided with electric field generating electrodes such as a pixel electrode, a common electrode, and the like, and a liquid crystal layer disposed between the substrates.

An LCD may apply voltage to a field generating electrode to generate an electric field in a liquid crystal layer and accordingly, determine a direction of alignment of liquid crystals of the liquid crystal layer to control the polarization of incident light, thereby displaying an image.

Among the LCDs, a vertically aligned mode LCD in which a long axis of the liquid crystal molecules are arranged to be vertical to a display panel in the state in which an electric field is not applied, has been in the limelight due to a high contrast ratio and a wide reference viewing angle thereof. In the vertically aligned mode LCD, a method of implementing a wide viewing angle is to form a plurality of domains in which alignment directions of liquid crystal molecules are different, in a single pixel region.

As a means of forming a plurality of domains, there is a method of forming a cut portion such as a slit or the like, in a field generating electrode. Liquid crystal molecules are rearranged by fringe field generated between field generating electrode portions facing an edge of the cut portion, whereby a plurality of domains may be defined.

As a result of forming the cut portion, the field generating electrode has a uniform pattern. For example, the field generating electrode may have a cross-shaped stem electrode portion and fine branch portions extended from the cross-shaped stem electrode portion. The cut portion may be disposed between the fine branch portions.

SUMMARY

However, an electrode pattern having a cross-shaped stem electrode portion and fine branch portions as described above is limited in improving transmittance and side visibility.

Accordingly, an exemplary embodiment of the invention may provide an electrode pattern capable of further improving transmittance and side visibility.

In addition, another exemplary embodiment of the invention may provide a liquid crystal display ("LCD") device having more improved display quality.

However, exemplary embodiments of the invention are not restricted to the one set forth herein. The above and other exemplary embodiments of the invention will become more apparent to one of ordinary skill in the art to which the invention pertains by referencing the detailed description of the invention given below.

According to an exemplary embodiment of the invention, there is provided an LCD device. The LCD device includes an insulating substrate, a data line disposed on the insulating substrate and extended in a first direction, a plurality of pixel electrodes which is disposed on the insulating substrate and in which a slit pattern is defined, a common electrode facing the pixel electrodes, and a liquid crystal layer interposed between the pixel electrodes and the common electrode, where each of the pixel electrodes includes an edge electrode portion and a plurality of branch electrode portions protruding in a direction toward a central portion of the pixel electrode from the edge electrode portion, and at least a portion of the edge electrode portion overlaps the data line.

In an exemplary embodiment, the pixel electrodes may include a first pixel electrode and a second pixel electrode disposed to be adjacent to the first pixel electrode in a second direction, and a distance between the first electrode and the second electrode may be equal to or greater than about 5 micrometers ("μm") and equal to or less than about 10 μm, the second direction intersecting the first direction.

In an exemplary embodiment, a region overlapping the pixel electrode defines a pixel region, the pixel region may include a plurality of different domains in which directivities of the plurality of branch electrode portions are different from one another, and the plurality of domains include a first domain, a second domain adjacent to the first domain in the first direction, and a third domain adjacent to the first domain in a second direction intersecting the first direction.

In an exemplary embodiment, a minimum distance between an end portion of a branch electrode portion overlapping the first domain and protruding toward the second domain among the plurality of branch electrode portions and an end portion of a branch electrode portion overlapping the second domain and protruding toward the first domain among the plurality of branch electrode portions may be smaller than a minimum distance between an end portion of a branch electrode portion overlapping the first domain and protruding toward the third domain among the plurality of branch electrode portions and an end portion of a branch electrode portion overlapping the third domain and protruding toward the first domain among the plurality of branch electrode portions.

In an exemplary embodiment, the minimum distance between the end portion of the branch electrode portion overlapping the first domain and protruding toward the second domain and the end portion of the branch electrode portion overlapping the second domain and protruding toward the first domain may be equal to or greater than about 2.5 μm and equal to or less than about 3.5 μm.

In an exemplary embodiment, the minimum distance between the end portion of the branch electrode portion overlapping the first domain and protruding toward the third domain and the end portion of the branch electrode portion overlapping the third domain and protruding toward the first domain may be equal to or greater than about 4.5 μm and equal to or less than about 5.5 μm.

In an exemplary embodiment, the LCD device may further include a sustain electrode line disposed between the insulating substrate and the pixel electrode and including at least a portion thereof overlapping the edge electrode portion of the pixel electrode.

In an exemplary embodiment, the at least a portion of the sustain electrode line may overlap the data line.

In an exemplary embodiment, the LCD device may further include a light shielding member disposed in a region overlapping at least a portion of the data line and the at least a portion of the edge electrode portion of the pixel electrode.

In an exemplary embodiment, the LCD device may further include a first alignment layer disposed between the pixel electrode and the liquid crystal layer, a second alignment layer disposed between the common electrode and the liquid crystal layer, a first photo-curing layer disposed between the first alignment layer and the liquid crystal layer, and a second photo-curing layer disposed between the second alignment layer and the liquid crystal layer, where the first photo-curing layer and the second photo-curing layer may be provided through polymerization of reactive mesogen.

According to another exemplary embodiment of the invention, there is provided an LCD device. The LCD device includes an insulating substrate, a plurality of pixel electrodes which is disposed on the insulating substrate and in which a slit pattern is defined, a common electrode facing the pixel electrodes, and a liquid crystal layer interposed between the pixel electrodes and the common electrode and including liquid crystal molecules, where a central slit portion including a horizontal slit portion and a vertical slit portion and a plurality of fine slit portions extended in a direction inclined from the central slit portion are defined in each of the pixel electrodes, a width of the horizontal slit portion is narrower than that of the vertical slit portion, a region overlapping the pixel electrode defines the pixel region, the pixel region includes a plurality of different domains in which directivities of the liquid crystal molecules are different from one another, and in a state in which an electric field is generated between the pixel electrode and the common electrode, the liquid crystal molecules within one of the plurality of domains are disposed in parallel with an extension direction of the fine slit portion and are aligned in a direction toward a central portion of the pixel electrode from a circumferential portion thereof.

In an exemplary embodiment, the width of the horizontal slit portion may be equal to or greater than about 2.5 μm and equal to or less than about 3.5 μm.

In an exemplary embodiment, the width of the vertical slit portion may be equal to or greater than about 4.5 μm and equal to or less than about 5.5 μm.

In an exemplary embodiment, the pixel electrode may further include an edge electrode portion disposed in the circumferential portion of the pixel electrode along an edge of the pixel electrode.

In an exemplary embodiment, the plurality of pixel electrodes may include a first pixel electrode and a second pixel electrode disposed to be adjacent to the first pixel electrode in a first direction, and a distance between the first electrode and the second electrode may be equal to or greater than about 5 μm and equal to or less than about 10 μm.

In an exemplary embodiment, the LCD device may further include a data line disposed on the insulating substrate and extended in a second direction, and at least a portion of the edge electrode portion overlaps the data line.

In an exemplary embodiment, the LCD device may further include a sustain electrode line disposed between the insulating substrate and the pixel electrode and including at least a portion thereof overlapping the edge electrode portion of the pixel electrode.

In an exemplary embodiment, the at least a portion of the sustain electrode line may overlap the data line.

In an exemplary embodiment, the LCD device may further include a light shielding member disposed in a region overlapping at least a portion of the data line and the at least a portion of the edge electrode portion of the pixel electrode.

In an exemplary embodiment, the LCD device may further include a first alignment layer disposed between the pixel electrode and the liquid crystal layer, a second alignment layer disposed between the common electrode and the liquid crystal layer, a first photo-curing layer disposed between the first alignment layer and the liquid crystal layer, and a second photo-curing layer disposed between the second alignment layer and the liquid crystal layer, where the first photo-curing layer and the second photo-curing layer may be provided through polymerization of reactive mesogen.

BRIEF DESCRIPTION OF DRAWINGS

The above and other exemplary embodiments and features of the invention will become more apparent by describing in detail exemplary embodiments thereof with reference to the attached drawings, in which.

DETAILED DESCRIPTION

Figure 1:
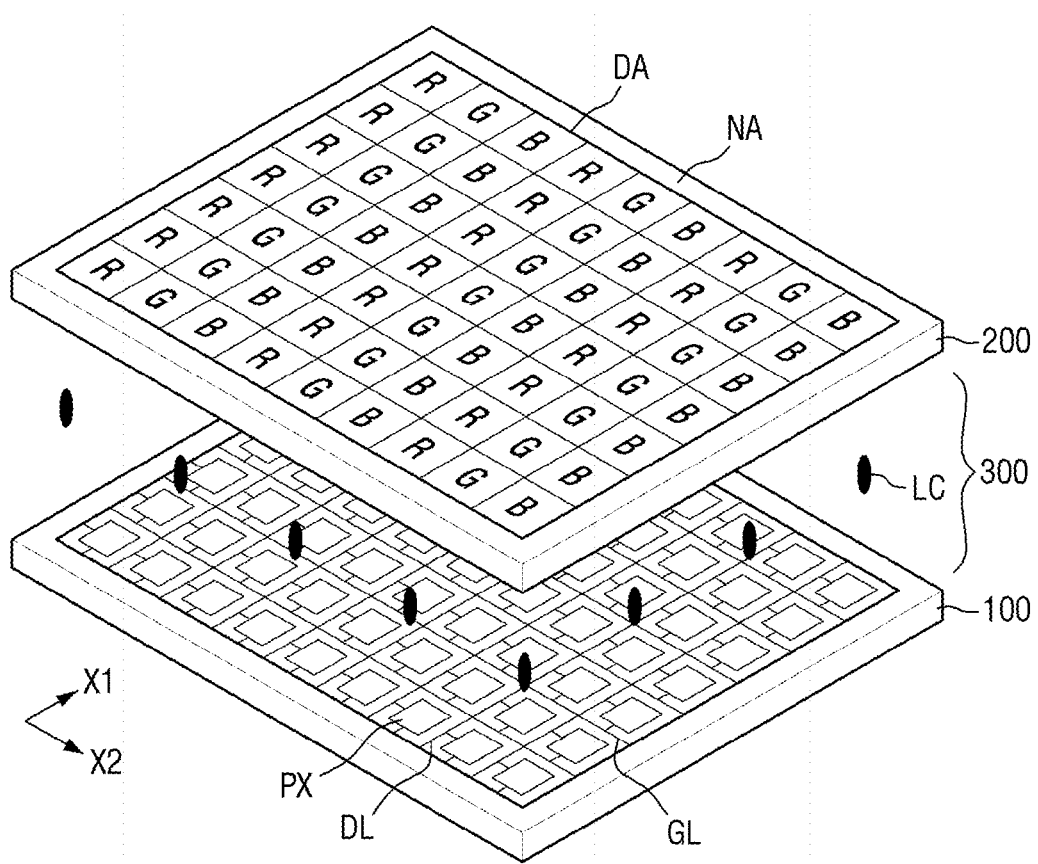
FIG. 1 is an exploded perspective view of a liquid crystal display ("LCD") device according to an exemplary embodiment of the invention.

Features of the invention and methods of accomplishing the same may be understood more readily by reference to the following detailed description of preferred embodiments and the accompanying drawings.

The invention may, however, be embodied in many different forms and should not be construed as being limited to the embodiments set forth herein. Rather, these embodiments are provided so that this disclosure will be thorough and complete and will fully convey the concept of the invention to those skilled in the art, and the invention will only be defined by the appended claims.

In the drawings, the thickness of layers and regions are exaggerated for clarity. It will be understood that when an element or layer is referred to as being "on," "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, connected may refer to elements being physically, electrically and/or fluidly connected to each other.

Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "below," "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, exemplary embodiments of the invention will be described with reference to the attached drawings.

FIG. 1 is an exploded perspective view of a liquid crystal display ("LCD") device according to an exemplary embodiment of the invention.

Referring to FIG. 1, an LCD device according to an exemplary embodiment of the invention may include a first substrate 100, a second substrate 200 spaced apart from and facing the first substrate 100, and a liquid crystal layer 300 interposed between the first substrate 100 and the second substrate 200. The first substrate 100 may be a lower substrate and the second substrate 200 may be an upper substrate.

Each of the first substrate 100 and the second substrate 200 may include a display area DA and a non-display area NA. The display area DA may be an image-visible region, and the non-display area NA may be an image-invisible region. An edge of the display area DA may be surrounded by the non-display area NA.

The display area DA may include a plurality of data lines DL extended in a first direction X1 (e.g., a row direction), a plurality of gate lines GL extended in a second direction X2 (e.g., a column direction), and a plurality of pixels PX disposed in intersections of the data lines DL and the gate lines GL. However, the invention is not limited thereto, and the plurality of data lines DL may extend in a column direction, and a plurality of gate lines GL may extend in a row direction. The plurality of pixels PX may be disposed in the first direction X1 and the second direction X2 and may have a substantially matrix shape.

Each of the pixels PX may inherently display one color among primary colors in order to implement a color display. In an exemplary embodiment, the primary colors may be, for example, red, green, and blue. However, the invention is not limited thereto, and the primary colors may include various other colors.

The non-display area NA may be a light-shielding region. In the non-display area NA of the first substrate 100, a driver (not shown) providing a gate driving signal, a data driving signal, and the like to the respective pixels PX may be disposed. The gate lines GL and the data lines DL may be extended from the display area DA to the non-display area NA and may be electrically connected to the driver (not shown).

The liquid crystal layer 300 may be interposed between the first substrate 100 and the second substrate 200. The liquid crystal layer 300 may include liquid crystal molecules LC having negative dielectric constant anisotropy but is not limited thereto. The liquid crystal layer 300 may also include liquid crystal molecules LC having positive dielectric constant anisotropy.

Hereinafter, pixels of the LCD device according to an exemplary embodiment of the invention will be described in detail.

Figure 2:
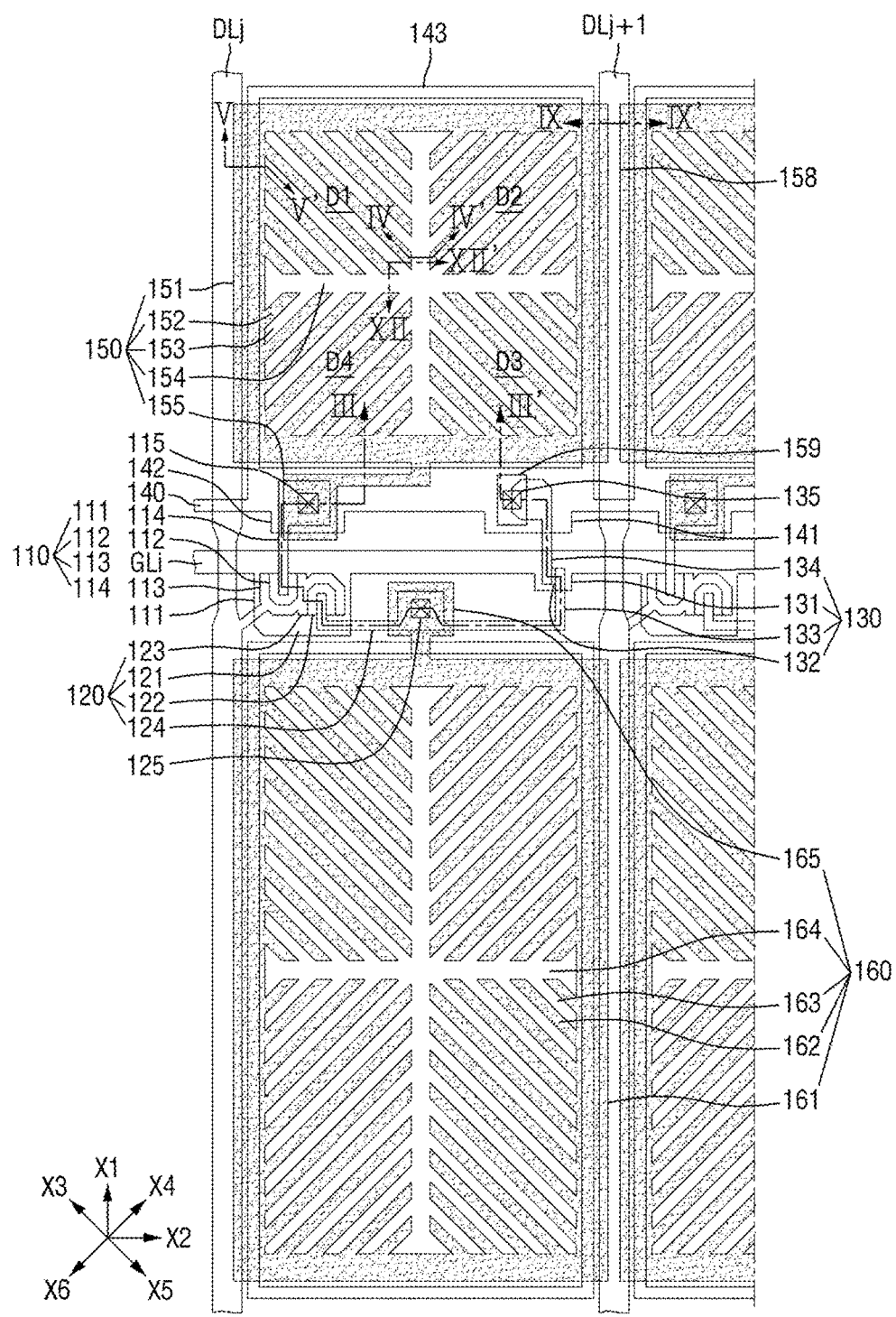
FIG. 2 is a plan view illustrating optional pixels of the LCD device of FIG. 1.
Figure 3:
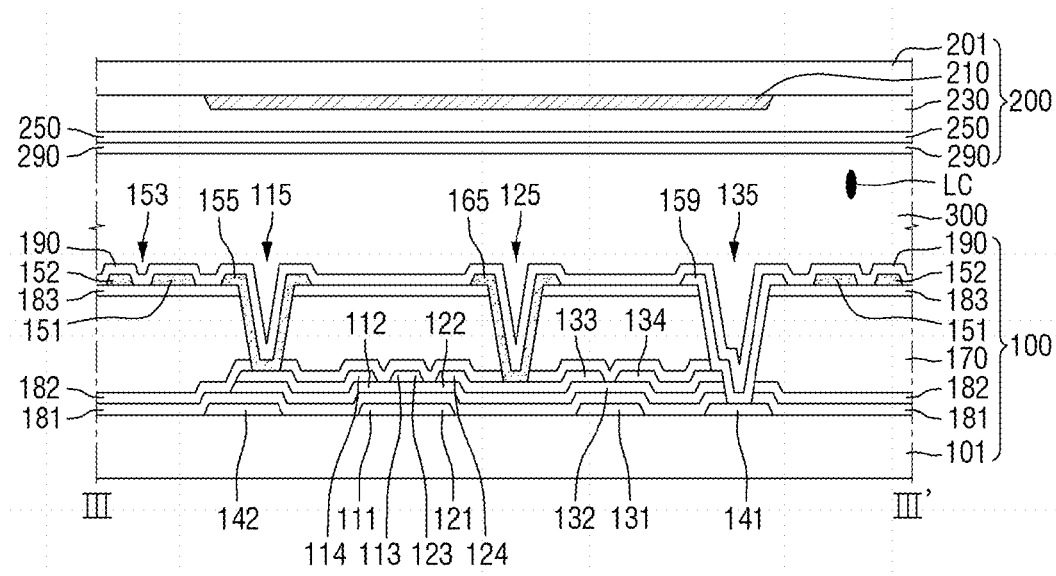
FIG. 3 is a cross-sectional view, taken along line of III-III' FIG. 2.

FIG. 2 is a plan view illustrating optional pixels of the LCD device of FIG. 1. FIG. 3 is a cross-sectional view, taken along line of III-III' FIG. 2.

Referring to FIGS. 2 and 3, the first substrate 100 may include a first base substrate 101, a plurality of thin film transistors ("TFTs"), a color filter 170, pixel electrodes 150 and 160, and the like.

In an exemplary embodiment, the first base substrate 101, a transparent insulating substrate, may include a material having superior transmittance, heat-resistant, and chemically-resistant properties. In an exemplary embodiment, the first base substrate 101 may be a silicon substrate, a glass substrate, a plastic substrate or the like, for example.

Gate wirings may be disposed on the first base substrate 101. The gate wirings may include a gate line GLi, a first gate electrode 111, a second gate electrode 121, a third gate electrode 131, and a voltage dividing reference line 140.

The gate line GLi may be extended in approximately the second direction X2. The first gate electrode to the third gate electrode 111, 121 and 131 may be provided to protrude from the gate line GLi. Specifically, the first gate electrode 111 and the second gate electrode 121 may protrude downwardly from the gate line GLi and may be unitary with each other, without a physical boundary therebetween. The third gate electrode 131 may be positioned on the right side, than the first and second gate electrodes 111 and 121. The first to third gate electrodes 111, 121, and 131 may be physically connected to the gate line GLi, and thus, the same gate signal may be applied to the first to third gate electrodes 111, 121, and 131.

The voltage dividing reference line 140 and the gate line GLi may be disposed on the same layer, and the voltage dividing reference line 140 may be extended to be substantially parallel to the gate line GLi. A reference voltage may be applied to the voltage dividing reference line 140. The reference voltage will be described to be later.

The voltage dividing reference line 140 may include a voltage dividing electrode 141, a sustain electrode 142, and a sustain electrode line 143. The voltage dividing electrode 141 may protrude downwardly from the voltage dividing reference line 140 and have a wide surface to thereby provide a space allowing for stable contact with a drain electrode 134. The sustain electrode 142 may be disposed in the neighborhood of the voltage dividing electrode 141. The sustain electrode 142 may also protrude downwardly from the voltage dividing reference line 140 and have a wide surface. The sustain electrode 142, together with a first drain electrode 114 disposed on the sustain electrode 142 to overlap therewith and a plurality of protective layers disposed therebetween, may form a sustain electric condenser. FIG. 2 illustrates a case in which the voltage dividing electrode 141 and the sustain electrode 142 are not continuous and a width of the voltage dividing reference line 140 between the voltage dividing electrode 141 and the sustain electrode 142 is slightly reduced. However, the invention is not limited thereto, and the voltage dividing electrode 141 and the sustain electrode 142 may be continuously provided while a boundary therebetween may not be discernible. The voltage dividing reference line 140 between the voltage dividing electrode 141 and the sustain electrode 142 may have the same width as that of the voltage dividing electrode 141 and/or the sustain electrode 142.

The sustain electrode line 143 may have a shape in which it protrudes from the voltage dividing reference line 140, overlaps at least one portion of an edge electrode portion 151 of the first sub-pixel electrode 150 while not overlapping a data line DLj, and is disposed along an edge of the first sub-pixel electrode 150. The sustain electrode line 143 may overlap at least one portion of the edge electrode portion 151 to shield a liquid crystal collision region to be described later, but is not limited thereto. In exemplary embodiments, the sustain electrode and/or the sustain electrode line may be omitted, and a shape and a disposition thereof may be variously modified.

On the gate line GLi and the voltage dividing reference line 140, a gate insulating layer 181 may be disposed over the entire surface of the first base substrate 101. The gate insulating layer 181 may include an insulating material and may electrically insulate an upper layer positioned above the gate insulating layer 181 and a lower layer positioned below the gate insulating layer 181 from each other. In an exemplary embodiment, the gate insulating layer 181 may include a material such as a silicon nitride (SiNx), a silicon oxide (SiOx), a silicon nitride oxide (SiNxOy), a silicon oxynitride (SiOxNy) or the like and may also have a multilayer structure including at least two insulating layers having different physical properties.

On the gate insulating layer 181, a semiconductor layer including first to third semiconductor layers 112, 122 and 132 may be disposed.

The first to third semiconductor layers 112, 122 and 132 may be disposed in regions overlapping the first to third gate electrodes 111, 121 and 131, respectively. The respective semiconductor layers may serve channels of the TFTs. The semiconductor layers may include a semiconductor material such as amorphous silicon, polycrystalline silicon, an oxide semiconductor or the like and may turn-on or -off the channels according levels of voltage supplied to the gate electrodes.

Data wirings may be disposed on the semiconductor layers. The data wirings may include data lines DLj and DLj+1, first to third source electrodes 113, 123, and 133, and first to third drain electrodes 114, 124 and 134.

The data line DLj may be extended in approximately the first direction X1 and may intersect with the gate line GLi. A data signal may be applied to the data line DLj. Pixel regions may be defined in an intersection of the data line DLj and the gate line GLi. However, the invention is not limited thereto, and Pixel regions may not be defined in an intersection of the data line DLj and the gate line GLi. The plurality of respective pixel regions may be independently operated by the plurality of TFTs connected to the gate line GLi and data line DLj corresponding thereto.

The first to third source electrodes 113, 123, and 133 and the first to third drain electrodes 114, 124 and 134 may be disposed on the first to third semiconductor layers 112, 122 and 132. The first source electrode 113 and the second source electrode 123 connected to each other without a physical boundary therebetween may protrude from the data line DLj in a direction of the first and second gate electrodes 111 and 121 and may be disposed on the first semiconductor layer 112 and the second semiconductor layer 122, respectively. The first and second source electrodes 113 and 123 may be respectively provided to surround at least a portion of the first and second drain electrodes 114 and 124. In an exemplary embodiment, each of the first and second source electrodes 113 and 123 may have a shape such as a C-shape, a U-shape, a reverse C-shape, a reverse U-shape or the like. The third source electrode 133 will be described to be later.

The first drain electrode 114 may be disposed on the first semiconductor layer 112 to be spaced apart from the first source electrode 113. In a similar manner, the second drain electrode 124 may be disposed on the second semiconductor layer 122 to be spaced apart from the second source electrode 123. The first and second drain electrodes 114 and 124 may be electrically connected to the first and second sub-pixel electrodes 150 and 160 through first and second contact holes 115 and 125, respectively, to be described later.

The third source electrode 133 may be disposed on the third semiconductor layer 132. The third source electrode 133 may be physically connected to the second drain electrode 124. The third drain electrode 134 may be disposed on the third semiconductor layer 132 to be spaced apart from the third source electrode 133. In addition, the third drain electrode 134 may be electrically connected to the voltage dividing electrode 141 through a third contact hole 135 and a contact electrode 159.

The first to third gate electrodes 111, 121 and 131, the first to third semiconductor layers 112, 122 and 132, the first to third source electrodes 113, 123, and 133, and the first to third drain electrodes 114, 124 and 134 may configure TFTs, three-terminal devices.

In detail, the first gate electrode 111, e.g., a control terminal of a first TFT 110, may be physically connected to the gate line GLi. The first source electrode 113, e.g., an input terminal of the first TFT 110, may be physically connected to the data line DLj. The first drain electrode 114, e.g., an output terminal of the first TFT 110, may be electrically connected to the first sub-pixel electrode 150.

The second gate electrode 121, e.g., a control terminal of a second TFT 120, may be physically connected to the gate line GLi. The second source electrode 123, e.g., an input terminal of the second TFT 120, may be physically connected to the data line DLj. The second drain electrode 124, e.g., an output terminal of the second TFT 120, may be electrically connected to the second sub-pixel electrode 160.

The third gate electrode 131, e.g., a control terminal of a third TFT 130, may be physically connected to the gate line GLi. The third source electrode 133, e.g., an input terminal of the third TFT 130, may be physically connected to the second drain electrode 124. The third drain electrode 134, e.g., an output terminal of the third TFT 130, may be electrically connected to the voltage dividing electrode 141.

Although not illustrated, an ohmic-contact layer (not shown) may be disposed between the semiconductor layers and the data wirings. In an exemplary embodiment, the ohmic-contact layer may include n+ amorphous silicon hydride or may include a silicide, for example.

A protective layer including a first protective film 182, the color filter 170, and a second protective film 183 may be disposed over the entire surface of the first to third TFTs 110, 120 and 130 and the data line DLj. The protective layer may include an organic layer and/or an inorganic layer and may have a single layer or multilayer structure.

In an exemplary embodiment, the first protective film 182 may include an inorganic insulating material such as a silicon nitride, a silicon oxide or the like. The first protective film 182 may prevent the wirings and electrodes disposed therebelow from being in direct contact with an organic material. The color filter 170 may be disposed between the plurality of neighboring data lines. The color filter 170 may allow for selective transmission of light in a specific wavelength band and, for example, color filters having different colors and allowing for transmission of light in different wavelength bands may be disposed in respective pixel regions adjacent to each other. The exemplary embodiment illustrates a case in which the color filter 170 has a color filter on array ("COA") structure disposed above the TFT, but the color filter may have an array on color filter ("AOC") structure disposed below the TFT or alternatively, the color filter may be disposed on the second substrate. In addition, a planarization layer (not shown) may be disposed on the color filter 170. The planarization layer may uniformize heights of a plurality of components stacked on the first base substrate 101.

The second protective film 183 may be disposed on the color filter 170. The second protective film 183 may prevent the lifting of the color filter 170 and inhibit contamination of the liquid crystal layer 300 due to an organic material such as a solvent introduced from the color filter 170 to prevent a defect such as an afterimage from being caused at the time of driving a screen.

The first protective film 182, the color filter 170, the planarization layer (not shown) and contact holes may be defined in the second protective film 183 to partially expose the first to third drain electrodes 114, 124 and 134 and the voltage dividing electrode 141. The first drain electrode 114 may be electrically connected to the first sub-pixel electrode 150 through the first contact hole 115, the second drain electrode 124 may be electrically connected to the second sub-pixel electrode 160 through the second contact hole 125, and the third drain electrode 134 may be electrically connected to the voltage dividing electrode 141 through the third contact hole 135 and the contact electrode 159.

On a portion of the second protective film 183 and regions exposed through the first to third contact holes 115, 125 and 135, the pixel electrodes including the first sub-pixel electrode 150 and the second sub-pixel electrode 160 and the contact electrode 159 may be disposed. The contact electrode 159 may serve to electrically connect the third drain electrode 134 and the voltage dividing electrode 141 exposed through the third contact hole 135 to each other. The contact electrode 159 may include the same material as that of the first and second sub-pixel electrodes 150 and 160 and provided through an integral process with first and second sub-pixel electrodes 150 and 160 to be described later.

The pixel electrodes may be disposed to correspond to the plurality of respective pixel regions and may form an electric field, together with a common electrode 250 disposed on the second substrate 201 to control an alignment direction of liquid crystal molecules LC of the liquid crystal layer 300 interposed therebetween. The pixel electrodes may be transparent electrodes. The transparent electrodes may include an indium tin oxide, an indium zinc oxide or the like, but are limited thereto. The pixel electrodes may include the first sub-pixel electrode 150 and the second sub-pixel electrode 160 spaced apart from each other in the first direction X1. As described above, the first sub-pixel electrode 150 may be electrically connected to the first drain electrode 114 and the second sub-pixel electrode 160 may be electrically connected to the second drain electrode 124.

The first sub-pixel electrode 150 may include a first edge electrode portion 151 having a substantially quadrangular shape, a plurality of first branch electrode portions 152, a plurality of first fine slit portions 153, a first central slit portion 154, and a first protrusion electrode portion 155 protruding downwardly.

In detail, the first edge electrode portion 151 may be disposed in the circumference of the first sub-pixel electrode 150 along an edge of the first sub-pixel electrode 150 and may connect end portions of the plurality of first branch electrode portions 152 to each other. The first branch electrode portions 152 may protrude and extend toward a central portion of the first pixel electrode 150 in directions inclined from respective sides of the first edge electrode portion 151 having a quadrangular shape, for example, in directions of approximately 45°. The first central slit portion 154 may be positioned in the central portion of the first sub-pixel electrode 150 to have a substantially cross (+) shape, and the first fine slit portions 153 may be defined and extended in a radial manner in directions inclined from the first central slit portion 154 having the cross (+) shape, for example, in directions of approximately 45°. Consequently, the first sub-pixel electrode 150 may have four regions divided by the first central slit portion 154 and having different directivities of the first branch electrode portions 152 and the first fine slit portions 153. The respective regions may serve as directors of the liquid crystal molecules LC and may form domains making different alignment directions of the liquid crystal molecules at the time of the driving thereof. In the specification, the domains may be referred to as first to fourth domains D1, D2, D3 and D4 from a left upper domain in a clockwise direction, whereby liquid crystal control force may be increased to allow for an increase in viewing angle and a decrease in texture and further, transmittance and a response speed may be improved. A concrete principle of forming the domains will be described with reference to FIGS. 4 and 5. The first protrusion electrode portion 155 may protrude downwardly of the first edge electrode portion 151 and may be electrically connected to the first drain electrode 114 through the first contact hole 115, as described above.

The second sub-pixel electrode 160 may include a second edge electrode portion 161 having a substantially quadrangular shape, a plurality of second branch electrode portions 162, a plurality of second fine slit portions 163, a second central slit portion 164, and a second protrusion electrode portion 165 protruding upwardly. The second sub-pixel electrode 160 may generally have a shape and a configuration substantially identical to those of the first sub-pixel electrode 150. However, the second sub-pixel electrode 160 may have a rectangular shape in which a distance thereof in a vertical direction is greater than a distance thereof in a horizontal direction. In an exemplary embodiment, a planar area ratio of pixel regions overlapping the first sub-pixel electrode 150 (hereinafter, high pixel regions) to pixel regions overlapping the second sub-pixel electrode 160 (hereinafter, low pixel regions) may be equal to or more than approximately 1:1.6 and may be equal to or less than approximately 1:2.4, for example.

Describing operations of pixels in a single frame interval, when a gate signal may be applied to the gate line GLi and thus, the first TFT 110 is turned on, a data voltage provided from the data line DLj may be applied to the first sub-pixel electrode 150. In this case, the amount of voltage equal to a difference between the data voltage and the common voltage may be charged between the first sub-pixel electrode 150 and the common electrode 250, and the pixel regions overlapping the first sub-pixel electrode 150 (high pixel regions) may be charged with a voltage having a voltage level relatively high than that of the pixel regions overlapping the second sub-pixel electrode 160, to be described later, to thereby control liquid crystals. At the same time, the second and third TFTs 120 and 130 may be electrically connect the data line DLj and the voltage dividing reference line 140 to each other and due to a voltage drop, a predetermined voltage having a value between a value of the data voltage and a voltage of a reference voltage lower than the data voltage may be applied to the second sub-pixel electrode 160. Thus, the pixel regions overlapping the second sub-pixel electrode 160 (low pixel regions) may be charged with a voltage having a voltage level relatively lower than that in the pixel regions overlapping the first sub-pixel electrode 150 to thereby control the liquid crystals. In the case of the high pixel regions charged with a relatively high voltage, side visibility may be low in a low grayscale section in which the liquid crystals are vertically aligned. In the case of the low pixel regions charged with a relatively low voltage, side visibility may be low in intermediate and high grayscale sections in which the liquid crystals are almost vertically aligned. That is, charging voltages of high and low pixels may be represented as different gamma curves and a gamma curve for a single pixel voltage, recognized by a viewer, may be provided by synthesizing these different gamma curves. The synthesized gamma curve in a front view is provided to coincide with a reference gamma curve in the front view determined to be most appropriate to the LCD device, and the synthesized gamma curve in a side view is provided to be closest to the reference gamma curve in the front view. In this manner, image data may be converted to improve side visibility. Effects of improving side visibility according to an exemplary embodiment of the invention will be described with reference to FIGS. 6 through 8.

The shapes and dispositions of the first and second sub-pixel electrodes 150 and 160 are merely provided by way of example, and in exemplary embodiments, the first and second sub-pixel electrodes 150 and 160 may be provided to be bent from the gate lines and the data lines, and may be modified to have branch electrode portions and slit portions having various shapes.

A first alignment layer 190 may be disposed over the entire surface of the first and second sub-pixel electrodes 150 and 160, the contact electrode 159, and the second protective film 183. The first alignment layer 190 may allow the liquid crystal molecules LC included in the liquid crystal layer 300 to be aligned in a specific direction on a plane. The first alignment layer 190 may be a photo-alignment layer including a first alignment layer (not shown) and a first photo-curing layer (not shown) disposed on the first alignment layer. In an exemplary embodiment, the first alignment layer 190 may be a vertically aligned mode alignment layer including a polyimide in which an imide group is included in a repeating unit of a main chain thereof, and at least one vertical alignment group among an alkyl group, a hydrocarbon derivative having an end substituted with the alkyl group, a hydrocarbon derivative having an end substituted with a cycloalkyl group, and a hydrocarbon derivative having an end substituted with an aromatic hydrocarbon is introduced to a side chain thereof. In an exemplary embodiment, the first photo-curing layer may be a polymer combination in which single molecules including the vertical alignment group and a photo-curing agent are chemically combined with each other. The photo-curing agent may be reactive mesogen. The reactive mesogen refers to a photo-crosslinkable low molecular or high molecular copolymer including a mesogen group having liquid crystal properties and absorbs light of a specific wavelength to generate a polymerization reaction. In an exemplary embodiment, the reactive mesogen may be, for example, acrylate, methacrylate, epoxy, oxetane, vinyl-ether, styrene, a thiolene group or the like. The first alignment layer 190 including the first alignment layer and the first photo-curing layer may maintain a pre-tilt even in a case in which an electric field is not provided by a light irradiation process and consequently, a response speed of the LCD device may be improved. In exemplary embodiments, the first alignment layer may be a rubbing alignment layer, not a photo-alignment layer.

Then, describing the second substrate 200, the second substrate 200 may be an upper substrate facing the first substrate 100. The second substrate 200 may include a second base substrate 201, a light shielding member 210, an overcoating layer 230, and the common electrode 250. The second base substrate 201 may be configured to include the same material as that of the first base substrate 101.

The light shielding member 210 and the overcoating layer 230 may be disposed on the second base substrate 201. The light shielding member 210 may be a black matrix. The light shielding member 210 may be disposed in a boundary between a plurality of the color filters to prevent light leakage defects. In detail, the light shielding member 210 may be disposed in a region overlapping components configuring the first to third TFTs as well as in a region overlapping the plurality data lines DLj and DLj+1, at least a portion of the sustain electrode line 143, and at least a portion of the first and second edge electrode portions 151 and 161. Unlike the case illustrated in the embodiment, the light shielding member may be disposed on the first substrate or may be omitted.

The overcoating layer 230 may be disposed on the light shielding member 210. The overcoating layer 230 may prevent the light shielding member 210 from being separated therefrom and may uniformize heights of components stacked on the second base substrate 201.

The common electrode 250 may be disposed on the overcoating layer 230. A common voltage may be applied to the common electrode 250 and thus, the common electrode 250, together with the pixel electrodes of the first substrate 100, may generate an electric field to thereby control alignment directions of the liquid crystal molecules LC of the liquid crystal layer 300 interposed therebetween. The common electrode 250 may be a transparent electrode such as the pixel electrode 150 or 160 and may be a patternless electrode having no slit pattern, but is not limited thereto. The common electrode 250 may also have a predetermined pattern. A second alignment layer 290 may be disposed on the common electrode 250. The second alignment layer 290 may include a configuration substantially identical to that of the first alignment layer 190 and thus, a detailed description thereof will be omitted.

Hereinafter, with reference to FIGS. 4 and 5, the principle of forming the plurality of domains in the pixel region and an alignment direction of liquid crystal molecules in each domain will be described in detail.

Figure 4:
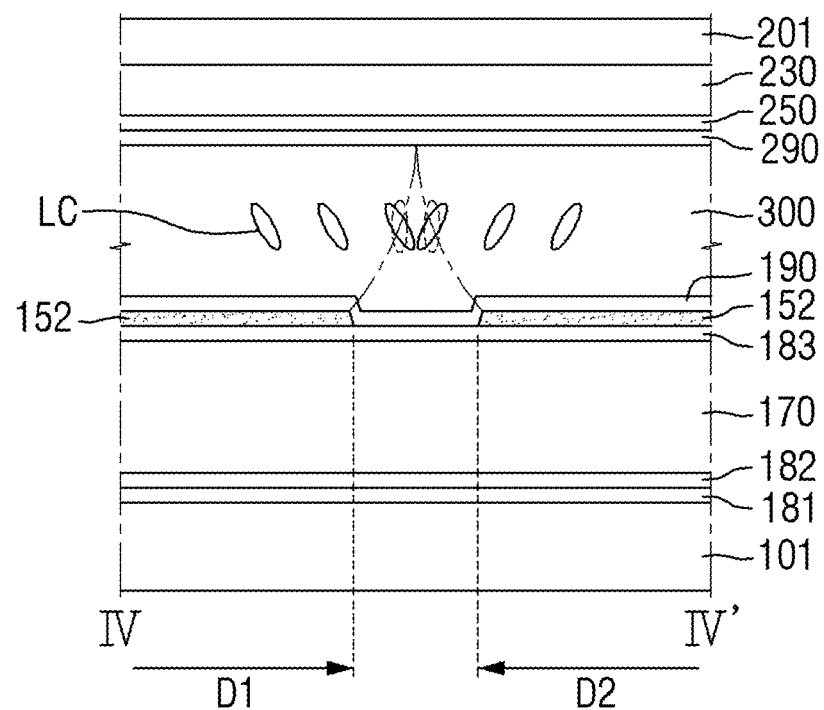
FIG. 4 is a cross-sectional view, taken along line IV-IV' of FIG. 2.
Figure 5:
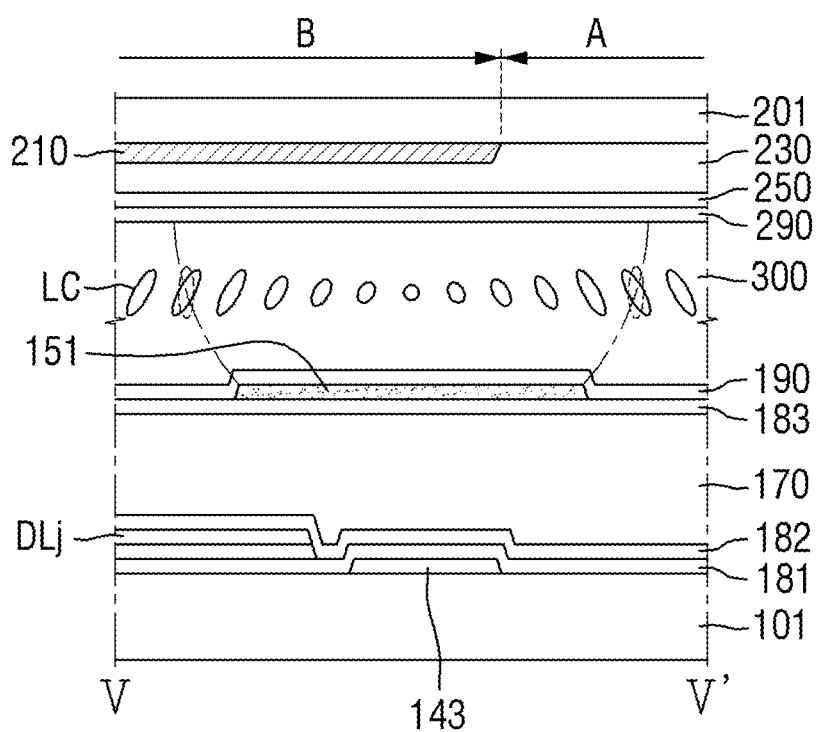
FIG. 5 is a cross-sectional view, taken along line V-V' of FIG. 2.

FIG. 4 is a cross-sectional view, taken along line IV-IV' of FIG. 2, and FIG. 5 is a cross-sectional view, taken along line V-V' of FIG. 2.

Referring to FIGS. 2 and 4, when a common voltage is applied to the common electrode 250 and a data voltage is applied to the first sub-pixel electrode 150, an electrical field may be generated between the common electrode 250 and the first sub-pixel electrode 150. In this case, a long axis of the liquid crystal molecules LC having negative dielectric constant anisotropy, included in the liquid crystal layer 300 may be vertically inclined with respect to the electric field, and a direction thereof may be a direction toward a circumferential portion of the first sub-pixel electrode 150 from a central portion thereof. Control force for controlling the liquid crystal molecules LC is the highest in end portions of the first fine branch electrode portions 152, and the liquid crystal molecules adjacent to each other may have the same directivity through a process of collision between the adjacent liquid crystal molecules, whereby a final alignment direction of the liquid crystal molecules within the same domain may be determined. The alignment direction may be substantially parallel to a direction in which the plurality of first fine branch electrode portions 152 of the first sub-pixel electrode 150 are extended. Thus, liquid crystal molecules of the first domain D1 may be aligned in approximately a third direction X3, and liquid crystal molecules of the second domain D2 may be aligned in approximately a fourth direction X4. The liquid crystal molecules of the third domain D3 may be aligned in approximately a fifth direction X5, and liquid crystal molecules of the fourth domain D4 may be aligned in approximately a sixth direction X6. Consequently, the plurality of domains D1, D2, D3 and D4 in which alignment directions of the liquid crystal molecules LC are different in the pixel region of the first sub-pixel electrode 150 may be implemented, and schematic alignment directions of the liquid crystal molecules within the plurality of domains may be directed toward the circumferential portion of the first sub-pixel electrode 150 from the central portion thereof Referring to FIGS. 2 and 5, as described in FIG. 4, due to the alignment of the liquid crystal molecules aligned in the end portions of the first fine branch electrode portions 152 having a high degree of liquid crystal control force, and the collision between the liquid crystal molecules belonging to the same domain, schematic alignment directions of the liquid crystal molecules in the vicinity of the circumferential portion of the first sub-pixel electrode 150, more particularly, an internal edge (a right edge in view of the drawing) of the first edge electrode portion 151, may also be directed toward the circumferential portion of the first sub-pixel electrode 150 from the central portion thereof. In the specification, a region in which the liquid crystal molecules are controlled to have a constant directivity, in the interior of the first edge electrode portion 151 and the central portion of the first sub-pixel electrode 150, is referred to an effective pixel region A. That is, the effective pixel region A may be a region not overlapping the light shielding member 210 and allowing light to be substantially transmitted therethrough.

The liquid crystal molecules in the vicinity of an external edge of the first edge electrode portion 151 (a left edge in view of the drawing) may be inclined toward the interior of the first sub-pixel electrode 150 by the electric filed generated between the common electrode 250 and the first edge electrode portion 151. In addition, in an approximately central region of a cross-section of the first edge electrode portion 151, cut in a width direction thereof, the liquid crystal molecules having different alignment directions may collide with each other, such that the liquid crystal molecules may be aligned in approximately the first direction X1. In the specification, a region in which the liquid crystal molecules are aligned in a direction different from that of the liquid crystal molecules of the effective pixel region A or the liquid crystal molecules collide with each other, in the vicinity of the external edge of the first edge electrode portion 151 and the approximately central region of the first edge electrode portion 151, is referred to as a liquid crystal collision region B. The alignment direction of the liquid crystal molecules in the liquid crystal collision region B may be different from that of the liquid crystal molecules in the effective pixel region A, whereby improvements in luminance and side visibility may be insignificant and light leakage defects may be caused. Thus, light may be blocked by the disposition of the light shielding member 210 or the like.

That is, a boundary between the effective pixel region A and the liquid crystal collision region B may be disposed on the first edge electrode portion 151, and in accordance with an increase in a planar area, transmittance and luminance as well as side visibility may be further improved. The properties may be controlled by a distance between the pixels adjacent to each other. A detailed description thereof will be described with reference to FIGS. 9 through 11.

Figure 6:
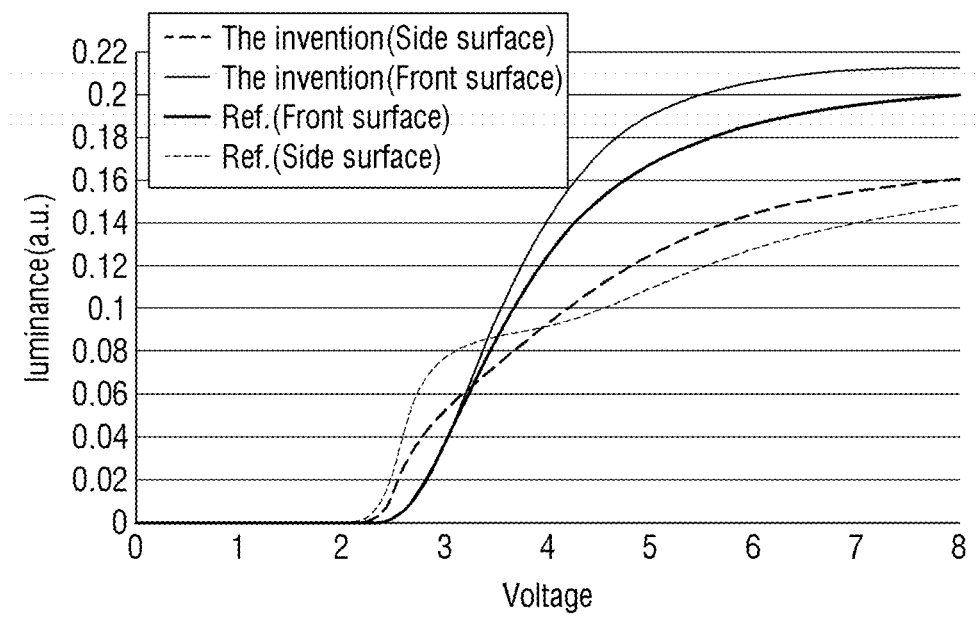
FIG. 6 is a graph illustrating results provided by measuring degrees of luminance according to voltage levels in a front surface and a side surface.
Figure 7A:
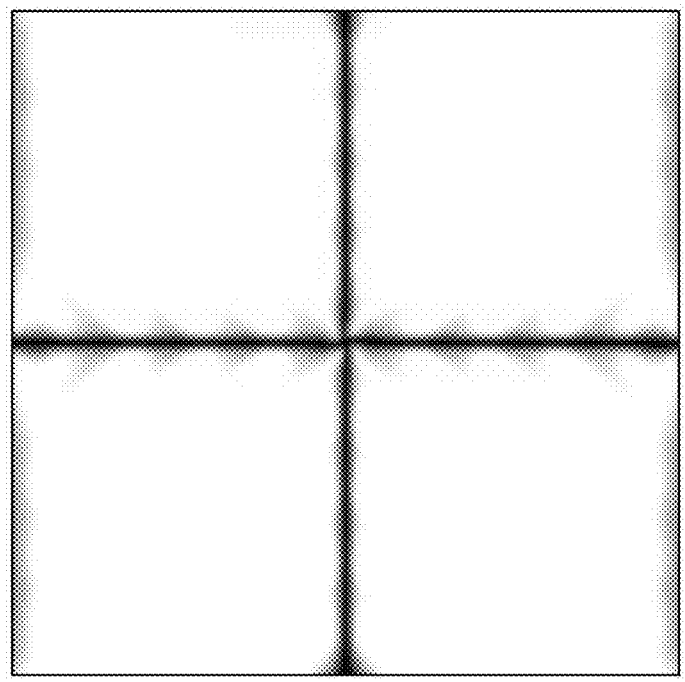
FIGS. 7a-7d are images of pixel regions according to voltage levels in a front surface and a side surface.
Figure 7B:
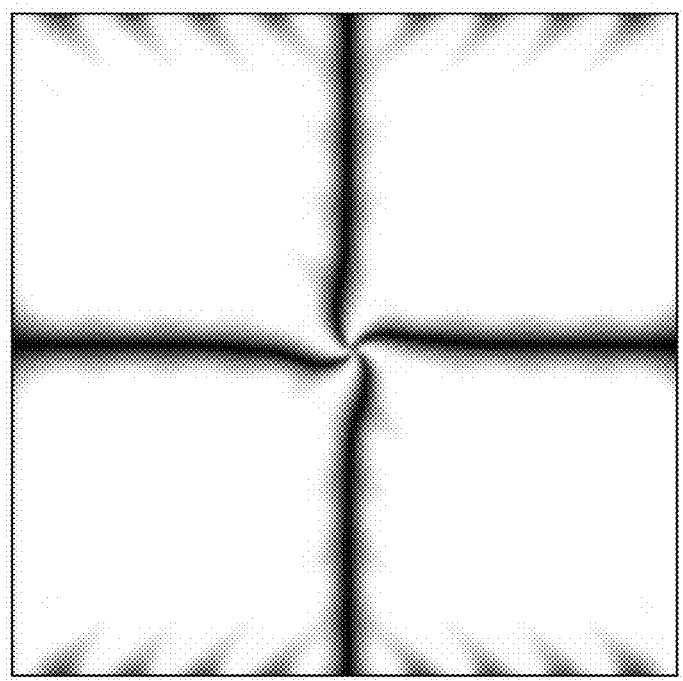
Figure 7C:
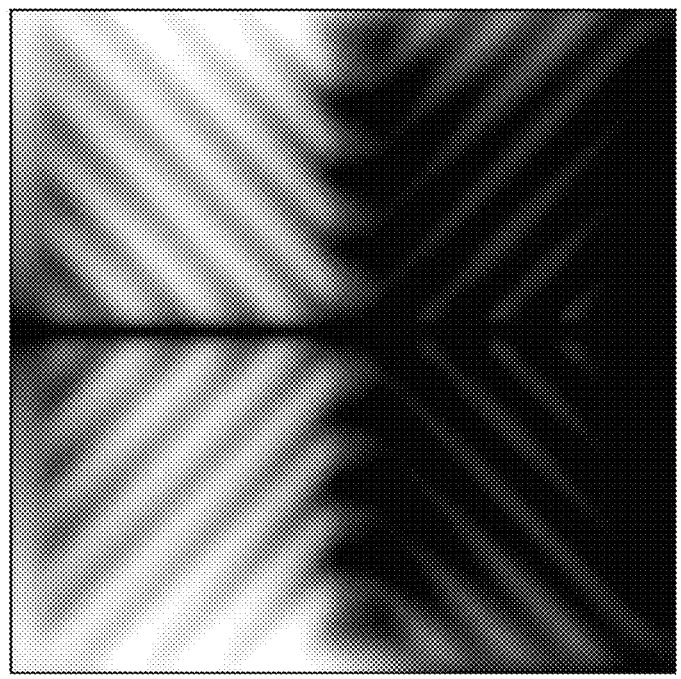
Figure 7D:
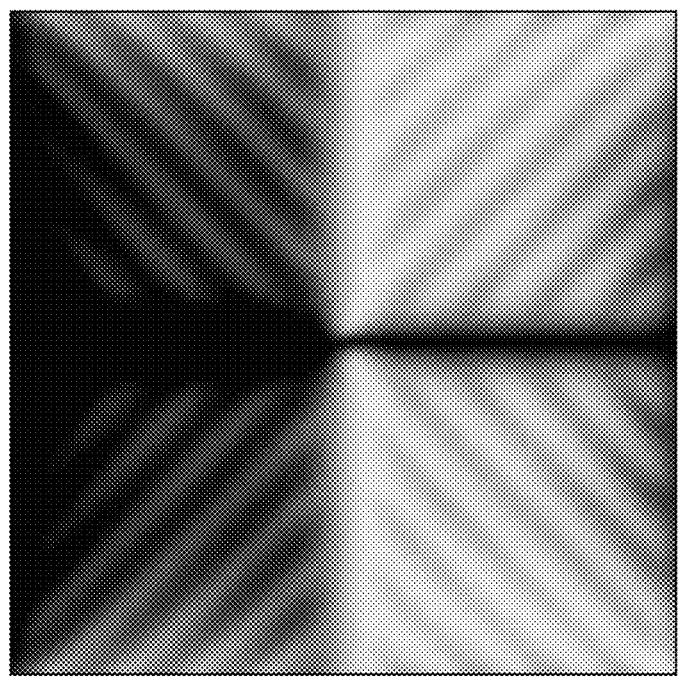
Figure 8:
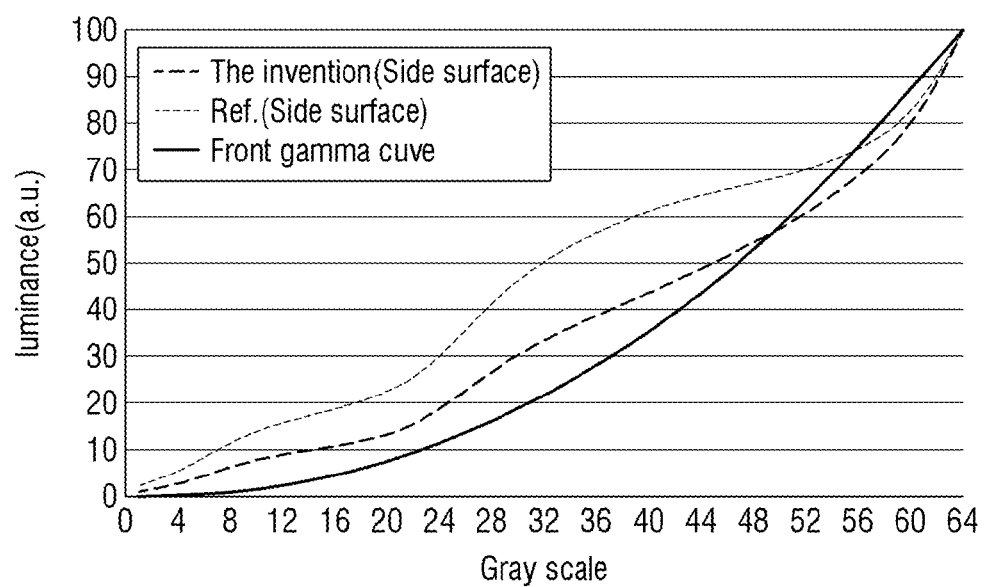
FIG. 8 is a graph illustrating a gamma curve.

FIG. 6 is a graph illustrating results provided by measuring degrees of luminance according to voltage levels in a front surface and a side surface. FIG. 7a is an image of one pixel region of a high grayscale section in a front surface of an LCD device according to an exemplary embodiment of the invention, FIG. 7b is an image of one pixel region of a high grayscale section in a front surface of an LCD device (reference) having a cross-shaped stem electrode portion, FIG. 7c is an image of one pixel region of a low grayscale section in a side surface of the LCD device according to an exemplary embodiment of the invention, and FIG. 7d is an image of one pixel region of a low grayscale section in a side surface of the LCD device (reference) having a cross-shaped stem electrode portion. FIG. 8 is a graph illustrating a gamma curve.

Referring to FIG. 6, in both of the front surface and the side surface, in the case of the LCD device according to an exemplary embodiment of the invention, it could be confirmed that degrees of luminance in intermediate and high grayscale sections were increased as compared to the LCD device (reference) having a cross-shaped stem electrode portion, and in particular, a degree of luminance is improved by about 6.2 percent (%) in the high grayscale section to which a voltage of about 8 volts (V) is applied. In addition, comparing FIGS. 7a and 7b with each other, it could be confirmed that as compared to FIG. 7a according to the exemplary embodiment of the invention, more amount of dark portions (i.e., texture) recognized as an approximately cross (+) shape is shown in a central portion of a pixel region in the case of FIG. 7b. In addition, in FIG. 7b, it could be confirmed that dark portions recognized as diagonal lines were shown in upper and lower ends of the pixel region. This is because that in the case of the LCD device according to an exemplary embodiment of the invention, since a cross-shaped stem electrode portion may be omitted as compared to the LCD device having a cross-shaped stem electrode portion, a collision region of liquid crystal molecules in a central portion of a pixel electrode may not be caused, such that transmission efficiency in the central portion of the pixel electrode may be increased.

Referring to the side surface, in the case of the LCD device (reference) having the cross-shaped stem electrode portion, a luminance increase curve according to an increase in voltage is not smooth and in particular, it could be confirmed that a lifting phenomenon of a side luminance curve in which a degree of luminance is hardly increased even with an increase in voltage in a low grayscale section to which a voltage of about 3V is applied occurred. It could be confirmed that in the case of the LCD device according to an exemplary embodiment of the invention, a luminance increase curve according to an increase in voltage is relatively smooth as compared to the LCD device (reference) having the cross-shaped stem electrode portion. In addition, comparing FIGS. 7c and 7d with each other, it could be confirmed that a contrast ratio of a brightly recognized left-half region and a darkly recognized right-half region is relatively large in FIG. 7c. It could be confirmed that a contrast ratio of a brightly recognized right-half region and a darkly recognized left-half region is relatively small in FIG. 7c.

As illustrated in FIG. 8, it could be confirmed that a side gamma curve is down in the entire grayscale section in the case of the LCD device according to an exemplary embodiment of the invention, as compared to the LCD device (reference) having the cross-shaped stem electrode portion. This means that the side gamma curve is more proximate to a front gamma curve, whereby even in the case of viewing the LCD device from the side surface thereof, an image proximate to that when viewing the LCD device from the front surface thereof may be recognized.

Hereinafter, a distance between components configuring the pixel electrode will be described with reference to FIGS. 9 through 13.

Figure 9:
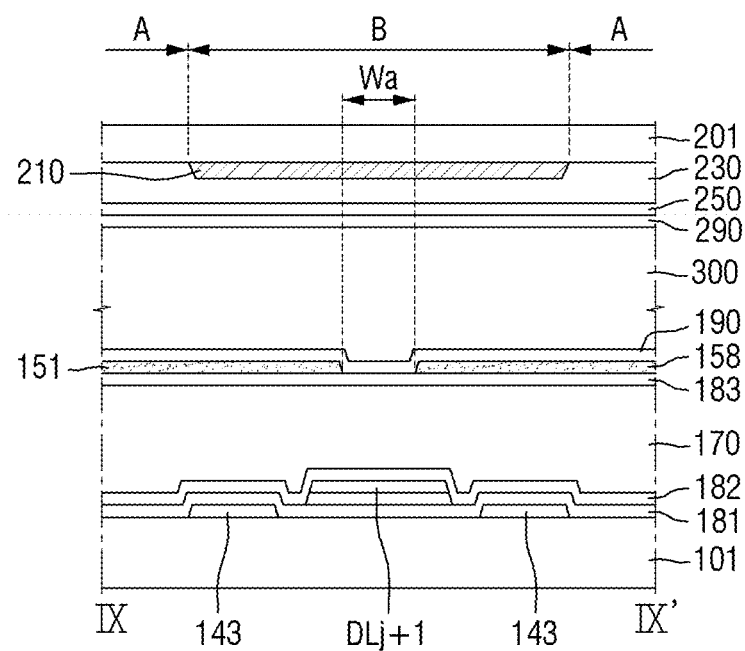
FIG. 9 is a cross-sectional view, taken along line IX-IX' of FIG. 2.
Figure 10:
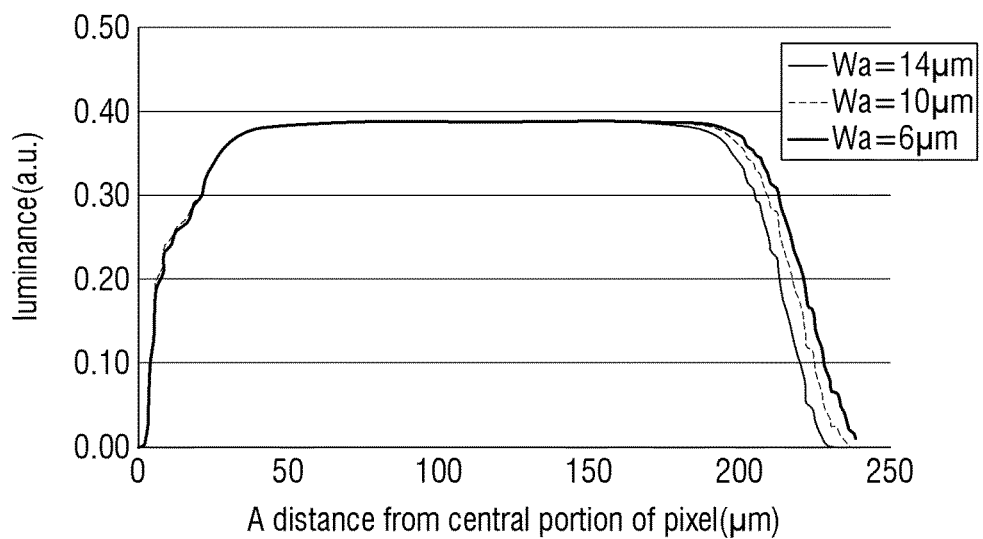
FIGS. 10 and 11 are graphs illustrating results provided by measuring degrees of luminance in positions within a pixel according to a distance thereof from an adjacent pixel.
Figure 11:
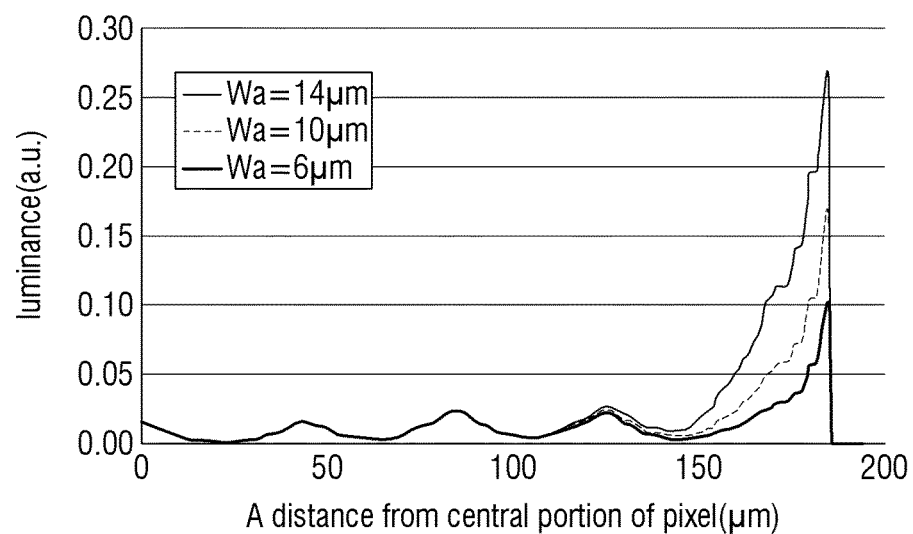

FIG. 9 is a cross-sectional view, taken along line IX-IX' of FIG. 2. FIGS. 10 and 11 are graphs illustrating results provided by measuring degrees of luminance in positions within a pixel according to a distance thereof from an adjacent pixel.

Referring to FIGS. 2 and 9, at least one portion of the first edge electrode portion 151 of one first sub-pixel electrode 150 may overlap the data line DLj+1, and the one first sub-pixel electrode 150 and another sub-pixel electrode may be adjacent to each other in the second direction X2 with the data line DLj+1 interposed therebetween. In addition, the light shielding member 210 may be disposed to overlap the data line DLj+1, the at least one portion of the first edge electrode portion 151 of the first sub-pixel electrode 150, and at least one portion of the sustain electrode line 143. A shape and a disposition of the adjacent sub-pixel electrode may be symmetrical with respect to the first sub-pixel electrode 150 based on the data line DLj+1. In this case, a space between the first edge electrode portion 151 of the first sub-pixel electrode 150 and an edge electrode portion 158 of the adjacent sub-pixel electrode in the second direction X2 may be defined as a pixel-to-pixel distance Wa.

FIG. 10 is a graph illustrating results provided by measuring luminance variations of a single domain of the first sub-pixel electrode in a diagonal direction in a high grayscale section (e.g., about 8V), from a front surface. FIG. 11 is a graph illustrating results provided by measuring luminance variations of a single domain of the first sub-pixel electrode in a horizontal direction in a low grayscale section (e.g., about 3V), from a side surface. In FIGS. 10 and 11, a point in which a distance from a pixel central portion is 0 refers to a central portion of the effective pixel region A, and a point far away from the pixel central portion is close to an edge of the effective pixel region A.

As illustrated in FIG. 10, in the central portion of the effective pixel region A, specifically, in a region ranging from the central portion of the first sub-pixel electrode to approximately about 190 µm in a diagonal direction, a difference in luminance depending on the pixel-to-pixel distance Wa is hardly shown. In an edge region of the effective pixel region A distant apart from the central portion of the first sub-pixel electrode by a distance of approximately about 190 µm or more, it could be confirmed that the difference in luminance depending on the pixel-to-pixel distance Wa is generated. Specifically, in accordance with the increase in the pixel-to-pixel distance Wa, a degree of luminance in the same point is reduced. This means that due to a decrease in a planar area of the effective pixel region A, texture occurred in the vicinity of the edge of the pixel region in a high grayscale section from the front surface and a degree of transmittance is reduced in the entire pixel region.

As illustrated in FIG. 11, in the central portion of the effective pixel region A, specifically, in a region ranging from the central portion of the first sub-pixel electrode to approximately about 130 µm in a horizontal direction, a difference in luminance depending on the pixel-to-pixel distance Wa is hardly shown. In an edge region of the effective pixel region A distant apart from the central portion of the first sub-pixel electrode by a distance of approximately about 130 µm or more, it could be confirmed that the difference in luminance depending on the pixel-to-pixel distance Wa is generated. Specifically, in accordance with the increase in the pixel-to-pixel distance Wa, degree of luminance in the same point is increased. This means that light leakage defects occurred in the vicinity of the edge of the pixel region in the low grayscale section from the side surface.

Consequently, a distance between adjacent pixels, that is, the pixel-to-pixel distance Wa, of the LCD device according to an exemplary embodiment of the invention, may be equal to or greater than about 5 μm and equal to or less than about 10 μm. When the pixel-to-pixel distance Wa is about 5 μm or more, pattern defects such as a pattern short and the like during the formation of a pixel electrode pattern may be prevented. When the pixel-to-pixel distance Wa is about 10 μm or less, the occurrence of texture may be minimized and a high degree of transmittance may be secured in the high grayscale section. In the low grayscale section, light leakage defects may be effectively prevented.

Figure 12:
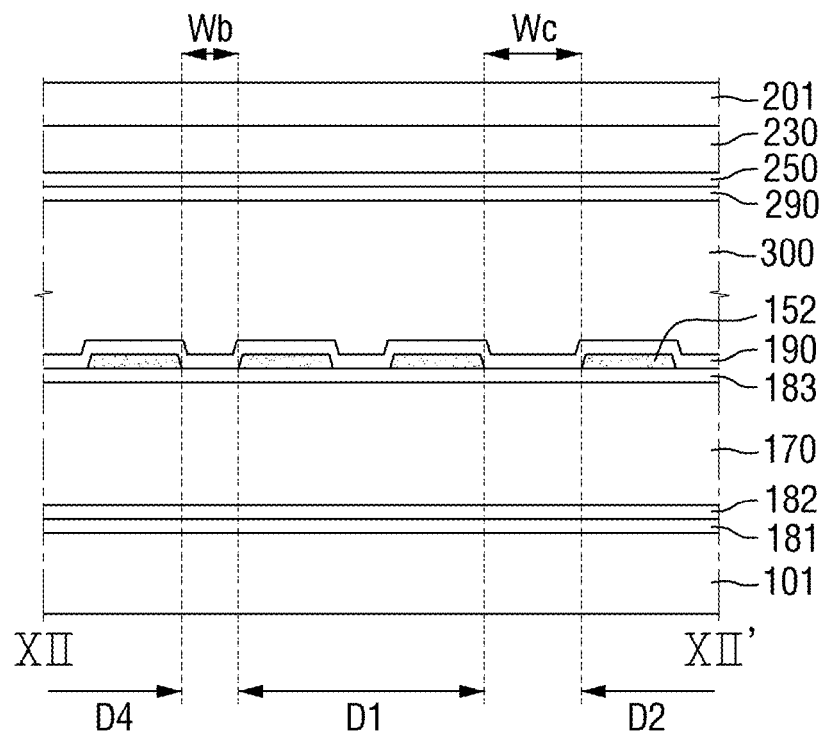
FIG. 12 is a cross-sectional view, taken along line XII-XII' of FIG. 2.
Figure 13:
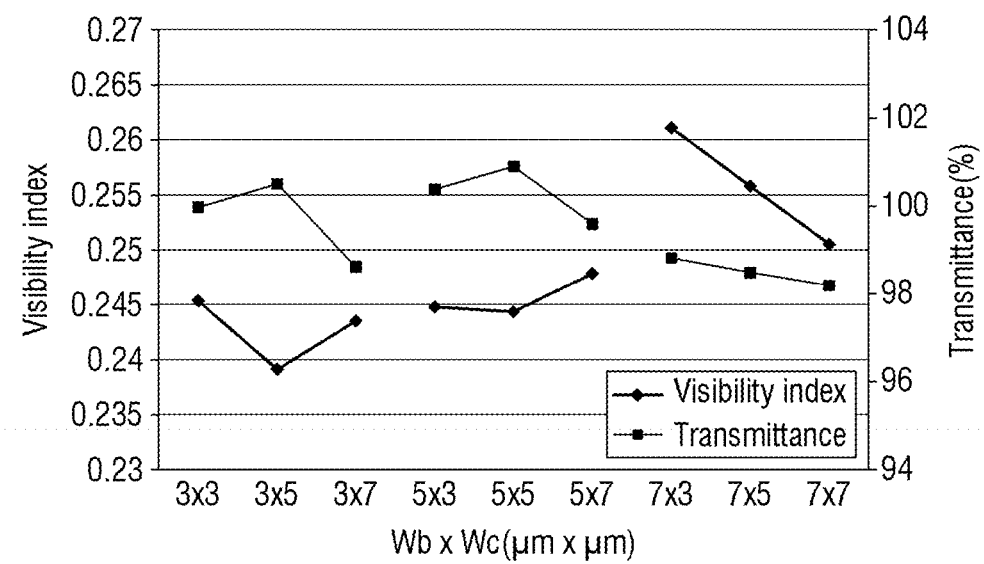
FIG. 13 is a graph illustrating results provided by measuring indices of visibility and transmittance according to a width of a horizontal slit portion and a width of a vertical slit portion.

FIG. 12 is a cross-sectional view, taken along line XII-XII' of FIG. 2. FIG. 13 is a graph illustrating results provided by measuring indices of visibility and transmittance according to a width of a horizontal slit portion and a width of a vertical slit portion.

Referring to FIGS. 2 and 12, the plurality of first fine slit portions 153 and the first central slit portion 154 including a horizontal slit portion and a vertical slit portion and having a substantially cross-shape may be positioned between the plurality of first branch electrode portions 152 of the first sub-pixel electrode 150. Through this, in the pixel region overlapping the first sub-pixel electrode 150, a plurality of different domains divided by the first central slit portion 154 and having different directivities of the first branch electrode portions 152 and the first fine slit portions 153 may be defined. The plurality of domains may include the first domain D1 in which the first branch electrode portions 152 protrude and extend in the fifth direction X5 from the first edge electrode portion 151, the second domain D2 in which the first branch electrode portions 152 protrude and extend in the sixth direction X6 from the first edge electrode portion 151, and the fourth domain D4 in which the first branch electrode portions 152 protrude and extend in the fourth direction X4 from the first edge electrode portion 151. In this case, a minimum distance between an end portion of the first branch electrode portion protruding and extending toward the fourth domain D4 adjacent to the first domain D1 in the first direction X1 among the plurality of first branch electrode portions within the first domain D1 and an end portion of the first branch electrode portion protruding and extending toward the first domain D1 among the plurality of first branch electrode portions within the fourth domain D4 may be defined by a width Wb of the horizontal slit portion. A minimum distance between an end portion of the first branch electrode portion protruded and extended toward the second domain D2 adjacent to the first domain D1 in the second direction X2 among the plurality of first branch electrode portions within the first domain D1 and an end portion of the first branch electrode portion protruding and extending toward the first domain D1 among the plurality of first branch electrode portions within the second domain D2 may be defined by a width Wc of the vertical slit portion.

As illustrated in FIG. 13, when the width Wb of the horizontal slit portion is about 3 μm or about 5 μm, it could be confirmed that a degree of transmittance is relatively high and a visibility index is relatively low as compared to the case in which the width Wb of the horizontal slit portion is about 7 μm. In addition, when the width Wb of the horizontal slit portion is about 3 μm, it could be confirmed that a visibility index is relatively low as compared to the case in which the width Wb of the horizontal slit portion is 5 μm. In particular, when the width Wb of the horizontal slit portion is about 3 μm and the width Wc of the vertical slit portion is about 5 μm, it could be confirmed that a degree of transmittance is relatively high and a visibility index is relatively low as compared to the case in which the width Wb of the horizontal slit portion is 3 μm and the width Wc of the vertical slit portion is about 3 μm or about 7 μm.

Consequently, the width Wb of the horizontal slit portion of the first sub-pixel electrode in the LCD device according to an exemplary embodiment of the invention may be narrower than the width Wc of the vertical slit portion thereof and in detail, the width Wb of the horizontal slit portion may be about 3 μm and the width Wc of the vertical slit portion may be about 5 μm, but the invention is not limited thereto. The widths of the horizontal slit portion and/or the vertical slit portion may be variously modified depending on desired properties of the LCD device.

Hereinafter, LCD devices according to other exemplary embodiments of the invention will be described. However, in order to clarify the substance of the invention, a description of components substantially identical to or similar to the foregoing LCD device will be omitted, and the said components could be clearly understood to a person having ordinary skill in the art from the attached drawings.

Figure 14:
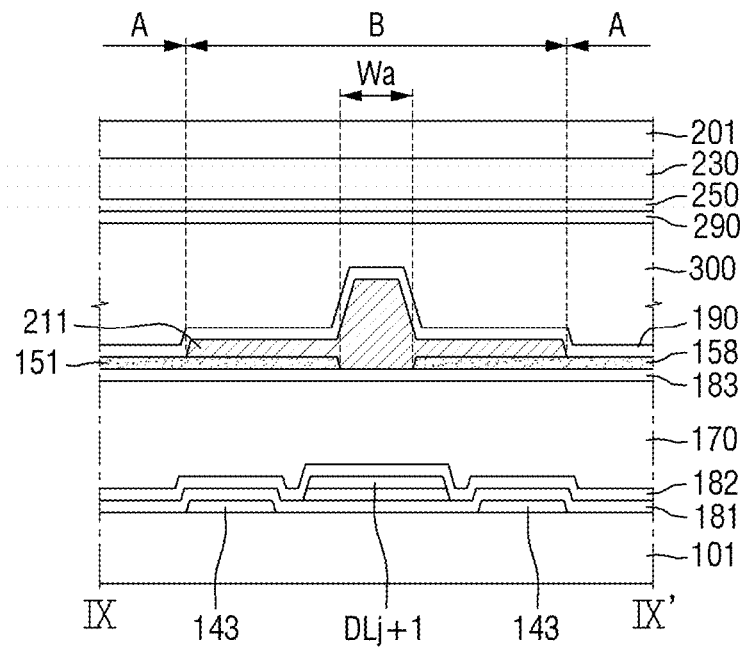
FIGS. 14 and 15 are cross-sectional views of LCD devices according to other exemplary embodiment of the invention.
Figure 15:
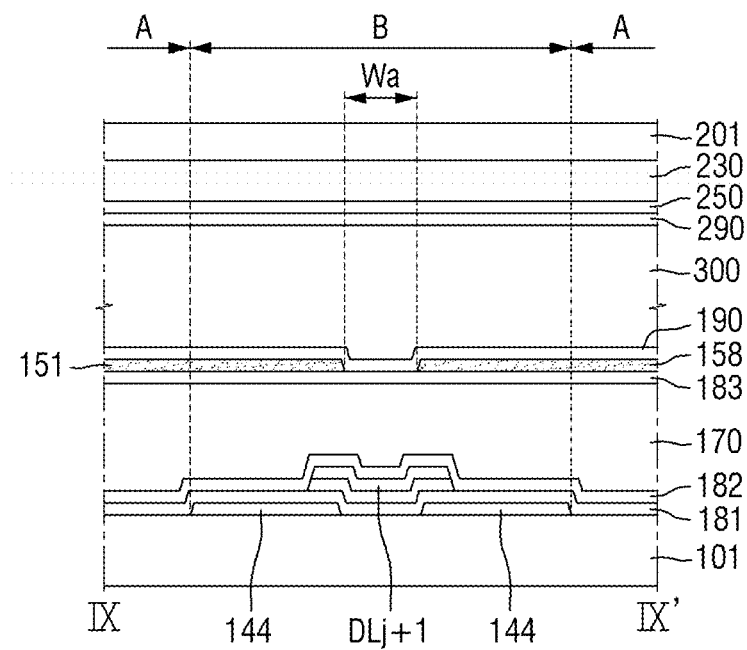

FIGS. 14 and 15 are cross-sectional views of LCD devices according to other exemplary embodiment of the invention.

The embodiment of FIG. 14 is different from that of FIG. 9 in that the light shielding member 211 is disposed on the first substrate 100. The light shielding member 211 according to the exemplary embodiment may be a black column spacer. The black column spacer may be disposed to overlap the data line DLj+1 and the at least a portion of the first edge electrode portion 151 of the first sub-pixel electrode 150 to prevent light leakage defects in the liquid crystal collision region B and at the same time, may allow a distance between the first substrate 100 and the second substrate 200 to be maintained. FIG. 14 illustrates a case of the black column spacer in which a top portion of the light shielding member 211 is spaced apart from the second substrate 200 by a predetermined distance to provide buffering properties to the second substrate 200, but in other exemplary embodiments, the top portion of the light shielding member 211 may substantially contact with the second substrate.

The embodiment of FIG. 15 is different from that of FIG. 9 in that a width of a sustain electrode line 144 in the second direction X2 is greater than that of the sustain electrode line 143 in the embodiment of FIG. 9. The width of the sustain electrode line 144 in the second direction X2, specifically, the width of the sustain electrode line 144 in a direction of the data line DLj+1 may be increased, such that the sustain electrode line 144 may overlap the data line DLj+1 and at least a portion of the semiconductor layers disposed below the data line. The sustain electrode line, an opaque electrode may overlap the data line DLj+1, an opaque electrode by increasing the width of the sustain electrode line 144, whereby light leakage defects in the liquid crystal collision region B may be minimized and at the same time, the light shielding member such as a separate black matrix may be omitted to thereby result in improvements in transmittance properties.

With the LCD device according to an exemplary embodiment of the invention, directors of liquid crystal molecules in a pixel region may be arranged in a direction from a central portion of a pixel electrode to an circumferential portion thereof, whereby light leakage defects occurring in a central portion of a pixel region in a low grayscale section may be alleviated and side visibility may be improved.

In addition, in a high grayscale section, a degree of transmittance in the central portion of the pixel region may be further improved, whereby an LCD device having improved display quality may be provided.

Effects according the invention are not limited to the contents exemplified above and more various effects are involved in the specification.

While exemplary embodiments have been shown and described above, it will be apparent to those skilled in the art that modifications and variations could be made without departing from the spirit and scope of the invention as defined by the appended claims. The exemplary embodiments should be considered in a descriptive sense only and not for purposes of limitation.

What is claimed is:

1. A liquid crystal display device comprising:
   an insulating substrate;
   a data line disposed on the insulating substrate and extended in a first direction;
   a plurality of pixel electrodes which is disposed on the insulating substrate and in which a slit pattern is defined;
   a common electrode facing the plurality of pixel electrodes, and
   a liquid crystal layer interposed between the plurality of pixel electrodes and the common electrode,
   wherein each of the plurality of pixel electrodes includes an edge electrode portion and a plurality of branch electrode portions protruding in a direction toward a central portion of the pixel electrode from the edge electrode portion,
   at least a portion of the edge electrode portion overlaps the data line,
   wherein
   a region overlapping the pixel electrode defines a pixel region,
   the pixel region includes a plurality of different domains in which directivities of the plurality of branch electrode portions are different from one another,
   the plurality of domains includes a first domain, a second domain adjacent to the first domain in the first direction, and a third domain adjacent to the first domain in a second direction intersecting the first direction, and
   a minimum distance between an end portion of a branch electrode portion overlapping the first domain and protruding toward the second domain among the plurality of branch electrode portions and an end portion of a branch electrode portion overlapping the second domain and protruding toward the first domain among the plurality of branch electrode portions is smaller than a minimum distance between an end portion of a branch electrode portion overlapping the first domain and protruding toward the third domain among the plurality of branch electrode portions and an end portion of a branch electrode portion overlapping the third domain and protruding toward the first domain among the plurality of branch electrode portions.

2. The liquid crystal display device of claim 1, wherein the plurality of pixel electrodes include a first pixel electrode and a second pixel electrode disposed to be adjacent to the first pixel electrode in a second direction intersecting the first direction, and a distance between the first electrode and the second electrode is equal to or greater than about 5 micrometers and equal to or less than about 10 micrometers.

3. The liquid crystal display device of claim 1, wherein the minimum distance between the end portion of the branch electrode portion overlapping the first domain and protruding toward the second domain and the end portion of the branch electrode portion overlapping the second domain and protruding toward the first domain is equal to or greater than 2.5 micrometers and equal to or less than 3.5 micrometers.

4. The liquid crystal display device of claim 3, wherein the minimum distance between the end portion of the branch electrode portion overlapping the first domain and protruding toward the third domain and the end portion of the branch electrode portion overlapping the third domain and protruding toward the first domain is equal to or greater than 4.5 micrometers and equal to or less than 5.5 micrometers.

5. The liquid crystal display device of claim 1, further comprising:
   a sustain electrode line disposed between the insulating substrate and the pixel electrode and including at least a portion thereof overlapping the edge electrode portion of the pixel electrode.

6. The liquid crystal display device of claim 5, wherein the at least a portion of the sustain electrode line overlaps the data line.

7. The liquid crystal display device of claim 1, further comprising:
   a light shielding member disposed in a region overlapping at least a portion of the data line and the at least a portion of the edge electrode portion of the pixel electrode.

8. The liquid crystal display device of claim 1, further comprising:
   a first alignment layer disposed between the pixel electrode and the liquid crystal layer;
   a second alignment layer disposed between the common electrode and the liquid crystal layer;
   a first photo-curing layer disposed between the first alignment layer and the liquid crystal layer; and
   a second photo-curing layer disposed between the second alignment layer and the liquid crystal layer,
   wherein the first photo-curing layer and the second photo-curing layer are provided through polymerization of reactive mesogen.

9. A liquid crystal display device comprising:
   an insulating substrate;
   a data line disposed on the insulating substrate and extended in a first direction;
   a plurality of pixel electrodes which is disposed on the insulating substrate and in which a slit pattern is defined;
   a common electrode facing the plurality of pixel electrodes, and
   a liquid crystal layer interposed between the plurality of pixel electrodes and the common electrode and including liquid crystal molecules,
   wherein a central slit portion including a horizontal slit portion and a vertical slit portion and a plurality of fine slit portions extended in a direction inclined from the central slit portion are defined in each of the plurality of pixel electrodes,
   the vertical slit portion extended in the first direction,
   a width of the horizontal slit portion is narrower than that of the vertical slit portion,
   a region overlapping the pixel electrode defines a pixel region,
   the pixel region includes a plurality of different domains in which directivities of the liquid crystal molecules are different from one another, and in a state in which an electric field is generated between the pixel electrode and the common electrode, the liquid crystal molecules within one of the plurality of domains are disposed in parallel with an extension direction of the fine slit portion and are aligned in a direction toward a circumferential portion of the pixel electrode from a central portion thereof.

10. The liquid crystal display device of claim 9, wherein the width of the horizontal slit portion is equal to or greater than 2.5 micrometers and equal to or less than 3.5 micrometers.

11. The liquid crystal display device of claim 10, wherein the width of the vertical slit portion is equal to or greater than 4.5 micrometers and equal to or less than 5.5 micrometers.

12. The liquid crystal display device of claim 9, wherein the pixel electrode further includes an edge electrode portion disposed in the circumferential portion of the pixel electrode along an edge of the pixel electrode.

13. The liquid crystal display device of claim 12, wherein the plurality of pixel electrodes include a first pixel electrode and a second pixel electrode disposed to be adjacent to the first pixel electrode in a second direction, and a distance between the first electrode and the second electrode is equal to or greater than 5 micrometers and equal to or less than 10 micrometers.

14. The liquid crystal display device of claim 12, further comprising:

at least a portion of the edge electrode portion overlaps the data line.

15. The liquid crystal display device of claim 14, further comprising:

a sustain electrode line disposed between the insulating substrate and the pixel electrode and including at least a portion thereof overlapping the edge electrode portion of the pixel electrode.

16. The liquid crystal display device of claim 15, wherein the at least a portion of the sustain electrode line overlaps the data line.

17. The liquid crystal display device of claim 14, further comprising:

a light shielding member disposed in a region overlapping at least a portion of the data line and the at least a portion of the edge electrode portion of the pixel electrode.

18. The liquid crystal display device of claim 9, further comprising:

a first alignment layer disposed between the pixel electrode and the liquid crystal layer;

a second alignment layer disposed between the common electrode and the liquid crystal layer;

a first photo-curing layer disposed between the first alignment layer and the liquid crystal layer; and a second photo-curing layer disposed between the second alignment layer and the liquid crystal layer, wherein the first photo-curing layer and the second photo-curing layer are provided through polymerization of reactive mesogen.

* * * * *